Patented Sept. 8, 1953

2,651,667

UNITED STATES PATENT OFFICE 2,651,667

RUBBER STABILIZED WITH A THIOUREA DERIVATIVE

Eugene F. Hill, Birmingham, and David O. De Pree, Royal Oak, Mich., assignors to Ethyl Corporation, New York, N. Y., a corporation of Delaware No Drawing. Application August 15, 1951, Serial No. 242,038

4 Claims. (Cl. 260—809)

This invention relates to the stabilization of elastomers. More particularly, our invention relates to inhibition of attack by oxygen, and the prolongation of the useful life of elastomer compositions. This application is a continuation-in-part of our copending application Serial No. 200,113, now abandoned.

All elastomeric materials are more or less susceptible to deterioration by oxygen or ozone. By such materials we refer to both the naturally occurring elastomers and the various synthetic elastomers. The degradation of such materials occurs both in the uncured or intermediate stages as well as in the finished, compounded or fabricated stage. Naturally occurring rubbers after coagulation of the latex and synthetic elastomers after polymerization and coagulation are particularly susceptible to the action of oxygen, ozone and light. Before useful articles can be fabricated from such elastomers various compounding, milling, vulcanization, curing, calendering, molding, extrusion or other processes or combinations thereof must be performed, during any of which operations such exposure can occur, and some means of protection is required to permit successful manufacture of the desired stock or article. Furthermore, during storage and use such exposure is encountered with deleterious effects unless suitable protective measures are taken.

This exposure can result in the destruction to a greater or less extent of certain useful physical properties and in the introduction of certain properties which render articles manufactured from such elastomers of limited utility. By absorption of oxygen or ozone such elastomers deteriorate prematurely, lose tensile strength and flexibility and become discolored, embrittled and surface cracking may occur. While certain materials have been proposed for the protection of such elastomers from the deleterious action of oxygen, most of such protective substances, as for example β-naphthol, possess the serious disadvantage, particularly with respect to light colored stocks, that the decomposition products of the protectant are themselves colored and hence interfere with the color fastness of the stocks being protected.

It is a primary object of our invention to provide a class of compounds which possesses the ability of inhibiting deterioration of elastomeric or plastic substances in the presence of oxygen. A further object of our invention is to retard the deterioration of such substances which normally are susceptible to attack by oxygen or ozone, and which thereby lose the utility in the service for which they were manufactured, compounded or otherwise prepared. A more particular object is to render elastomer stocks and elastomer compositions stable on prolonged storage or during manufacture or use in the presence of oxygen. Still other objects will appear hereinafter.

The above objects can be accomplished by practicing our invention which comprises adding to organic materials a small proportion of a substance derived from the class of N,N'-bis(p-aminophenyl)thioureas, wherein the amino groups are free or substituted with cyclic or acyclic saturated paraffin hydrocarbon radicals. Examples of such saturated paraffin hydrocarbon groups which we can employ include methyl, ethyl, propyl, isopropyl, n-butyl, sec.-butyl, isobutyl, and the isomeric amyl, hexyl, octyl, dodecyl, octadecyl and higher radicals, as well as, for example, cyclobutyl, cyclohexyl, and the hydrocarbon-substituted derivatives thereof, such as for example benzyl, β-phenylethyl and methylcyclohexyl.

In general, we prepare the compounds of this invention by treating a p-phenylenediamine with carbon disulfide in the presence of sulfur. When pure the majority of our compounds are crystalline solids and are obtained readily and in good yield.

In the example which follows we illustrate the preparation of a typical embodiment of the antioxidants of our invention. In this example all parts and percentages are by weight.

EXAMPLE

*N,N' - bis(p-dimethylaminophenyl)thiourea.*—A reaction vessel provided with an efficient agitator, means for introducing solid and liquid reactants and withdrawing gaseous by-products, means for supplying and removing heat, vapor condensing means and means for returning liquid reflux to the reaction vessel was charged with a solution of 100 parts of N,N-dimethyl-p-phenylenediamine in 1100 parts of anhydrous ethanol. Maintaining the temperature of the reactants at 25° C., 28 parts of carbon disulfide was added over a period of five minutes. The resulting solution was heated, with agitation, to the reflux temperature at atmospheric pressure, and 29 parts of sulfur was added rapidly. The resulting mixture was stirred and refluxed for an additional period of three hours, during most of which period a steady evolution of hydrogen sulfide gas was withdrawn from the reaction vessel. The reaction mixture was thereupon maintained at a temperature of 25° C. for fifteen hours, at the end of which time the temperature was raised to 60° C. and the mixture was filtered. The filtrate from this operation was concentrated to a thick slurry at 0.1 atmosphere. This slurry was treated with 200 parts of water and the suspended solid product was recovered by filtration. The product was further washed with water and dried. The product, N,N'-bis(p-dimethylaminophenyl)thiourea, was 190 parts, corresponding to a yield of 80 per cent. The melting point of this material was 187° C.

By procedures directly analogous to the foregoing example we obtain other N,N'-bis(p-dialkylaminophenyl)thiourea antioxidants by treating an N,N - dialkyl - p-phenylenediamine with carbon disulfide in the presence of sulfur. Thus, by reacting, in accordance with the above, N,N - diethyl - p - phenylenediamine, N,N-di-n-butyl-p-phenylenediamine, N-methyl-N-propyl-p-phenylenediamine, N-methyl-N-cyclohexyl-p-phenylenediamine, N,N - dioctadecyl-p-phenylenediamine and N-ethyl-N-(2-methylhexyl)-p-phenylenediamine with carbon disulfide and sulfur we obtain, respectively, N,N'-bis(p-diethylaminophenyl)thiourea, N,N' - bis(p-di-n-butylaminophenyl)thiourea, N,N' - bis(p - methylpropylaminophenyl)thiourea, N,N' - bis(p - methylcyclohexylaminophenyl)thiourea, N,N'-bis(p-dioctadecylaminophenyl)thiourea, and N,N'-bis(p-ethyl-2-methylhexylaminophenyl)thiourea.

Furthermore, we likewise prepare the N,N'-bis-(p - monoalkylaminophenyl)thioureas by the same method as described in detail in the above working example. Thus, when we treat each of the following N-alkyl-p-phenylenediamines with carbon disulfide and sulfur, namely N-methyl-p-phenylenediamine, N-isopropyl-p-phenylenediamine, N - cyclobutyl - p-phenylenediamine, N-(mixed)amyl-p-phenylenediamine, N-benzyl-p-phenylenediamine, and N-t-butyl-p-phenylenediamine, we obtain, respectively, N,N'-bis(methylaminophenyl)thiourea, N,N'-bis(isopropylaminophenyl)thiourea, N,N' - bis(cyclobutylaminophenyl)thiourea, N,N' - bis(mixed-amylaminophenyl)thiourea, N,N'-bis(benzylaminophenyl)-thiourea and N,N'-bis(t-butylaminophenyl)thiourea.

To prepare the compound N,N'-bis(p-aminophenyl)thiourea we modify somewhat the procedure of the above working examples. In this instance we prefer to treat the N-monoacetate of p-phenylenediamine, prepared by reduction of the N-monoacetate of p-nitroaniline, with carbon disulfide and sulfur, thereby producing N,N'-bis(p-acetaminophenyl)thiourea, which on mild alkaline hydrolysis produces N,N'-bis(p-aminophenyl)thiourea.

To demonstate the protection afforded to rubber by the compounds of our invention, the tensile strength and the ultimate elongation of stocks prepared with the addition of the antioxidants of our invention were determined before and after aging and were compared with the same properties determined on an identical rubber stock not protected by the compounds of our invention but having the same state of cure. The composition of this stock was as follows:

| | Parts by weight |
|---|---|
| Smoked sheet | 100.00 |
| Carbon black | 45.00 |
| Zinc oxide | 5.00 |
| Stearic acid | 3.00 |
| Pine tar oil | 2.00 |
| Sulfur | 3.00 |
| Mercapto-benzothiazole | 0.65 |
| Stabilizing ingredient | 1.00 |
| | 159.65 |

Both of these properties were determined by means of the test procedure of ASTM designation: D412-41, fully described in ASTM Standards for 1946, Part III-B. The tensile strength is the tension load per unit cross-sectional area required to break a test specimen, while the ultimate elongation is the elongation at the moment of rupture of a test specimen. A decrease in the values for either of these properties upon aging represents a decrease in the usefulness of the article fabricated therefrom. Thus, the degree to which these properties are retained is a direct measure of the utility of the protective substance.

TABLE

*Effect on aging properties of rubber*

| No. | Antioxidant | Percent of original retained after aging | |
|---|---|---|---|
| | | Tensile Strength | Ultimate Elongation |
| 1 | N,N' - Bis (p - dimethylaminophenyl)thiourea. | 43.3 | 71.5 |
| 2 | None | 24.5 | 55.0 |
| 3 | o-Phenylenethiourea | 12.9 | 27.3 |
| 4 | N,N'-Diphenylthiourea | 10.6 | 39.2 |

It is at once apparent that our compound provides a remarkable degree of protection to rubber under these severe conditions. The significance of the p-amino group of our compounds is readily shown by comparison with No. 4 in the table, N,N'-diphenylthiourea, wherein a pro-oxidant effect is produced by this apparently simply modification of our compounds. Similarly orthophenylene thiourea, item No. 3 in the above table, is likewise a pro-oxidant although chemically a certain similarity exists between this compound and our antioxidants.

The quantities of the compounds of our invention incorporated in the materials to be stabilized are not critical and depend largely upon the type of elastomer or formulation being stabilized and the conditions under which the exposure to oxygen occurs. For the majority of applications the compounds of our invention are preferably employed in amount between the limits of approximately 0.1 and 2.0 parts per 100 parts of material to be stabilized, although somewhat larger amounts of the stabilizers of our invention can be tolerated and in some instances are preferred. Thus, our compounds can be satisfactorily employed in a wide range of concentrations, and we do not intend that our invention be restricted to the specific quantities mentioned herein.

We have disclosed a number of preferred embodiments of our invention and illustrated several means whereby protection can be afforded to elastomeric materials sensitive to attack by oxygen. Our invention is not intended to be limited to the specific embodiments of our invention herein or to the means described herein for obtaining the advantages possible in employing our compounds, as other methods of practicing our invention will be apparent to those skilled in the art.

We claim:

1. The composition of claim 4 wherein the principal antioxidant material is an N,N'-bis(p-monoalkylaminophenyl) thiourea.
2. The composition of claim 4 wherein the principal antioxidant material is an N,N'-bis(p-dialkylaminophenyl) thiourea.
3. The composition of claim 4 wherein the principal antioxidant material is N,N'-bis(p-aminophenyl) thiourea.
4. A composition consisting essentially of rubber and, as a principal antioxidant material in quantity sufficient to prevent said deterioration by oxygen, an N,N'-bis(p-aminophenyl) thiourea antioxidant.

EUGENE F. HILL.
DAVID O. DE PREE.

No references cited.